Oct. 23, 1934.                D. M. FERGUSON ET AL                1,978,300
                                  MOTOR VEHICLE
                              Filed June 13, 1931              2 Sheets-Sheet 1

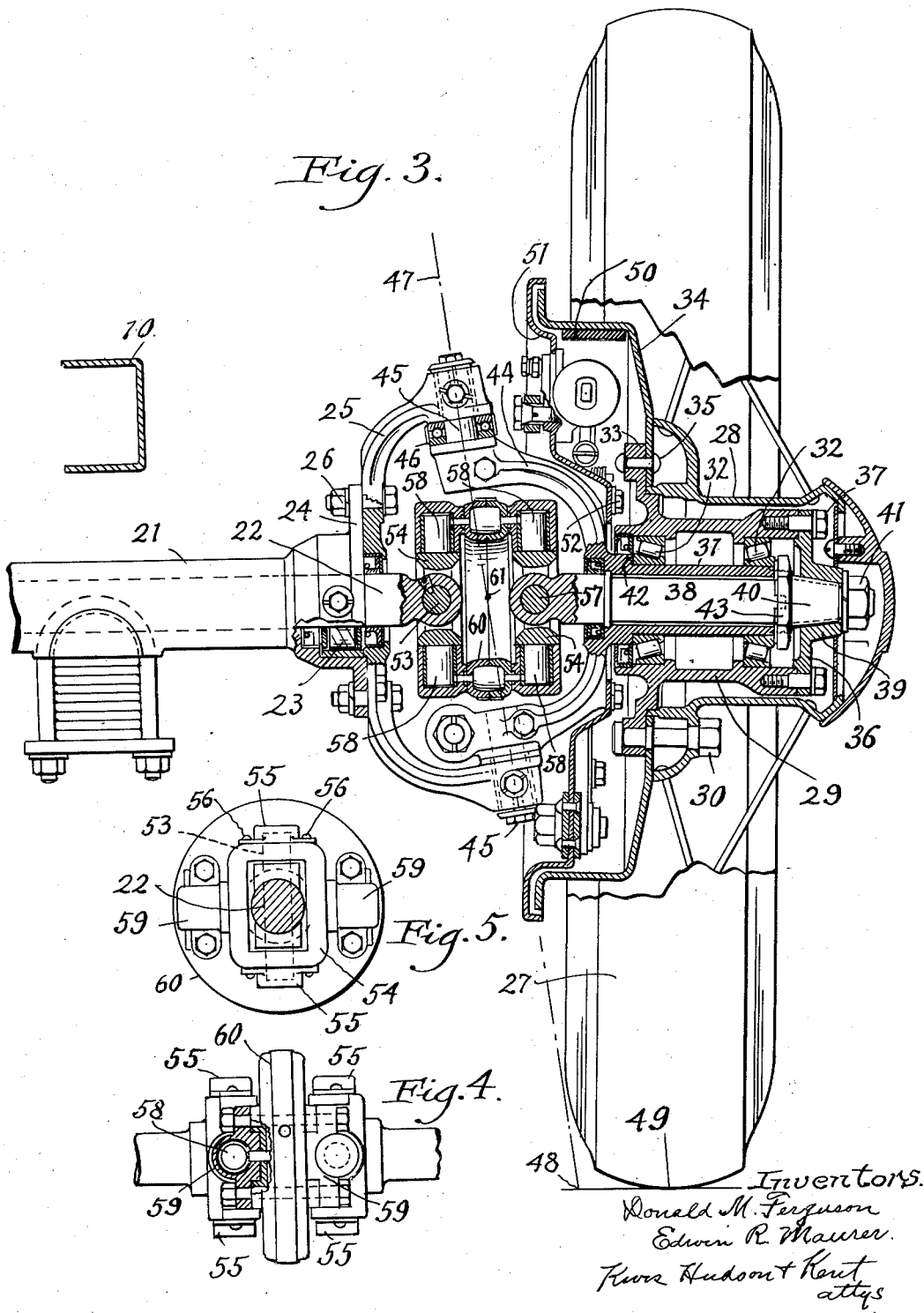

Patented Oct. 23, 1934

1,978,300

UNITED STATES PATENT OFFICE 1,978,300

MOTOR VEHICLE

Donald M. Ferguson, Highland Park, and Edwin R. Maurer, Detroit, Mich., assignors to Wilcox-Rich Corporation, Detroit, Mich., a corporation of Michigan Application June 13, 1931, Serial No. 544,088

2 Claims. (Cl. 180—43)

This invention relates to motor vehicles, and more particularly to front-wheel drives therefor.

Front-wheel drives have numerous advantages over rear-wheel drives, for automobiles, in that the power is so applied that the vehicle is pulled by the front axle instead of being pushed by the rear axle, which lessens the liability to skid on curves or slippery pavements or when the front wheels get into ruts in the road.

Another advantage of the front-wheel drive is that it makes steering easier due to the pull on the steering wheels being in the direction of steering and there is less pulling on the steering control wheel, due to obstructions in the road, because the front steering wheels are not pushed over the obstructions as in the case of the rear-wheel drive.

A further advantage of the front-wheel drive is that there is less bouncing of the driving wheels on rough roads, because of the relatively short front springs and the relatively restricted amount of permissible spring deflection.

A still further advantage of the front-wheel drive is in the reduced unsprung weight on the rear wheels so that the maximum passenger load of the automobile is over the wheels having the minimum unsprung weight. This results from the fact that, in the usual automobile, the front seat passengers are located substantially midway between the front and rear axles, and the rear seat passengers are over the relatively light rear axle.

While the foregoing advantages apply, as a general rule, to front-wheel drives as compared with rear-wheel drives, it is the object of the present invention to improve the front-wheel drive so as to eliminate any tendency for the front wheels to shimmy or wabble.

A further object of the invention is to provide a front-wheel drive that is applicable to a chassis without requiring any increase in the wheel base over that of a rear-wheel drive, and permitting the use of longer bodies than existing front-wheel drives for any given wheel base and thereby securing better distribution of the load and better riding conditions.

A further object is to provide a construction in which the accessibility of the engine, transmission and clutch is not lessened, as compared with the rear-wheel drive.

Another object is to provide a front axle construction that is accessible for any necessary adjustments or repairs to the axle mechanism or brakes, and to have the axle an independent unit from the engine.

A further object of the invention is to provide an automobile with a front-wheel drive that will be more or less interchangeable with the standard rear-wheel drive and permit the use of the same bodies and motor and require the minimum number of changes so that, as a commercial proposition, it will be possible for a manufacturer of standard rear-wheel drive automobiles to incorporate a front-wheel drive therein at a minimum of additional expense.

Other objects of the invention and the features of novelty will be apparent from the following description, taken in connection with the accompanying drawings, of which Figure 1 is a fragmentary side elevation of the front end of an automobile embodying our invention, certain parts being broken away.

Fig. 3 is an enlarged longitudinal section through one end of the axle and the steering spindle pivoted thereto.

Fig. 4 is a side elevation of one of the pairs of universal joints, with certain parts in section, and Fig. 5 is an end elevation thereof.

Figure 1:
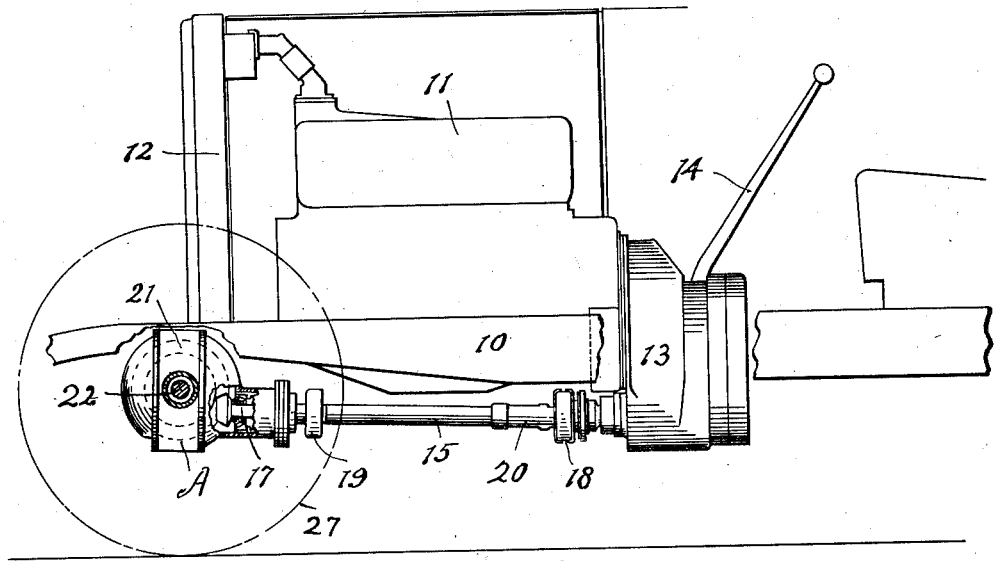
Figure 2:
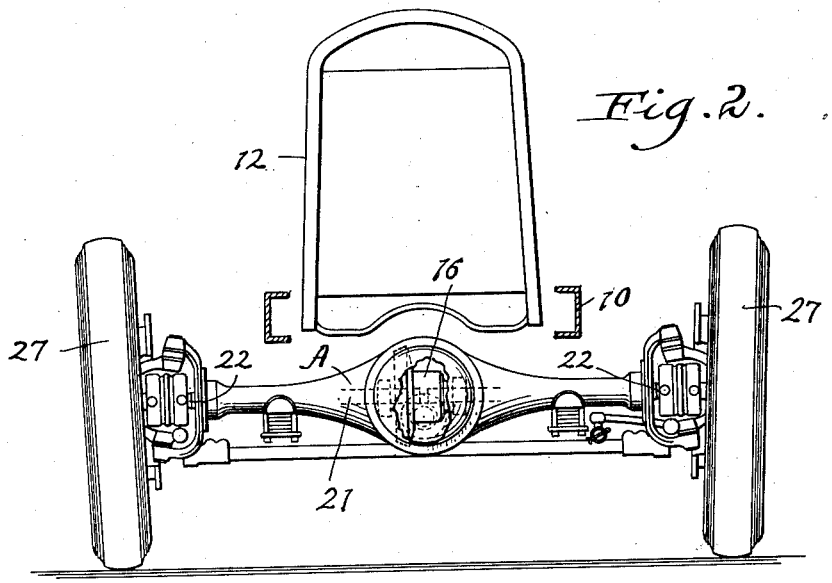
Fig. 2 is a front elevation thereof with certain parts shown in section.

Referring to the drawings, 10 indicates one of the side members of the automobile frame and 11 an engine mounted thereon. The usual radiator is indicated at 12 and the usual clutch and sliding gear transmission are enclosed in a housing 13 which may be mounted on the rear of the engine, in accordance with usual practice. The gear shift lever is indicated at 14 and the propeller shaft at 15. The front driving axle is indicated generally at A and comprises the usual differential 16 at the center of the axle which, in this instance, is preferably driven by a pair of hypoid gears, from the propeller shaft 15. The use of the hypoid gears permits the pinion shaft 17 to be located below the center of the axle so that the propeller shaft 15 will normally lie in a substantially horizontal position below the engine 11 and the universal joints 18 and 19, in the propeller shaft, will be subjected to the minimum angularity. The propeller shaft 15 also comprises the usual splined connection 20 to permit lengthening and shortening of the shaft due to the movements of the axle A.

The front driving axle comprises the usual substantially rigid housing 21 for the differential 16 and the substantially rigid axle shafts 22. The shafts 22 are each supported in a roller bearing 23 and have their inner ends connected with and supported by the differential, by the usual splined connection such as illustrated at 17 in the Alden Patent 1,188,601, June 27, 1916. The housing 21 has flanges 24 at its ends and yokes 25 are bolted or otherwise secured to these flanges, as indicated at 26.

The road wheels 27 may be of any suitable construction but we have shown, in Fig. 3, a wire wheel construction embodying an outer hub 28 which is mounted upon and secured to the inner hub 29 by a series of bolts 30. The inner hub 29 is rotatably mounted on a hollow steering spindle 31 by means of the anti-friction bearings 32 and has a flange 33 to which the brake drum 34 is riveted or otherwise secured, as indicated at 35. A flange 36 is rigidly secured to the inner hub 29 by means of a circle of bolts 37 and a short shaft 38 is secured to the hub 39, of the flange 36, by a splined taper 40 and a nut 41.

One of the bearings 32 abuts against the shoulder 42 on the steering spindle 31 and the other bearing 32 is mounted on the outer end of the steering spindle and both bearings are secured in position by a nut 43 which is threaded onto the extreme end of the spindle 31. The inner ends of the steering spindles 31 have yokes 44 formed integral therewith and these yokes are pivotally connected with the yokes 25 by means of pins 45. A thrust bearing 46 is preferably employed between the upper arm of the yoke 44 and the upper arm of the yoke 25 and the pivotal connections between the steering spindle 31 and the yokes 25 have their axes so inclined, as indicated at 47, that their points of intersection 48, with the ground, are located inwardly of the centers of contact of the wheels 27, with the ground, as indicated at 49. An internal brake 50 cooperates with the drum 34 and may be of any preferred construction and operated by any suitable form of mechanism which may be mounted on the plate 51, which acts as a dust shield for the brake and is secured to the yoke 44 by bolts 52.

A pair of universal joints connects each of the shafts 22 with a wheel-driving shaft 38. The shaft 22 carries a pin 53 which has its outer ends pivotally mounted in a yoke 54, the ends of the pin 53 being enclosed in the caps 55 which are secured to the yoke 54 by cap screws 56. In a similar manner the shaft 38 is connected with the yoke 54 of the cooperating differential by means of a pin 57. The yokes 54 have trunnions 58 on opposite sides and these trunnions are mounted in bearings 59 that are secured to a ring 60 which serves as the connecting element for the two universals.

From Fig. 3 it will be noted that the central plane and axis of the ring 60 intersect the axis 47 of the pins 45 at the point 61 so that the universal joints are symmetrically positioned on opposite sides of the axis 47. This arrangement permits the universal joints to function without interfering with the steering movements of the wheels 27.

It will be noted that the shafts 22 and 38 are independently supported and connected together only through the pair of universal joints and the ring 60 so that any wear in the thrust bearing 46, which would permit the axis of the shaft 38 to assume a position above the plane of the axis of the shaft 22, would not in any way interfere with the drive because the two universal joints, connecting the shafts, would accommodate such misalignment. The shaft 38 is supported solely, at its outer end, by means of the flange 36 which is rigidly attached to the inner hub 29 of the wheel and the shaft 22, being supported in the bearing 23, in the outer end of the axle housing 21, is thereby prevented from shifting radially of the axis of the bearing 23. The shaft 22, being loosely splined to the differential 16, in accordance with usual practice, and being free to shift longitudinally of its axis, through the bearing 23, is capable of axial movement to accommodate the steering movements of the wheel 27.

Many advantages arise from the construction and arrangement of parts, above described, and one of these advantages is that the wheels 27 will be driven, at all times, at the same angular velocity as the shafts 22 by which they are driven. When the shafts 38 are positioned substantially in alignment with the shafts 22, for straight-ahead driving, the shafts 22 will be driven at the same angular velocity as the ring gear of the differential 16 and, assuming that the propeller shaft 15 is being rotated at a constant angular velocity, under these conditions, the wheels 27 would be driven at a constant angular velocity. When the wheels are swung to any given position by means of the steering gear, in order to turn a corner, the wheels 27 will, of course, rotate at different relative angular velocities because they are located at different distances from the center of the curve about which the car is turning, but the angular velocities of the wheels 27 will, even under these conditions, be constant so long as the angular velocity of the ring gear of the differential remains constant. This is because of the use of the two universal joints for connecting each of the shafts 22 with the shaft 38 which it drives. When the wheels 27 are swung about the axes 47, for steering, the universal joints which connect the shafts 22 with the rings 60, will cause each of these rings to rotate at angular velocities which constantly vary above and below the angular velocity of this shaft 22, during each revolution, but the other universal joint of each pair, which is connected with the shaft 38, will produce similar variations that are opposite in phase so that each shaft 38 will rotate, at all times, at the same angular velocity as the shaft 22 by which it is driven.

By having the center of ground contact 49, of each of the wheels 27, located outwardly of the intersection 48 of the axis 47 with the ground, the driving torque on the wheels 27 will have a constant tendency to swing the wheels 27 inwardly about the axes 47 and, since these wheels are connected together by the usual steering linkage the tendency of one wheel to rotate about its axis 47 will be neutralized by the corresponding tendency of the opposite wheel to rotate about its axis 47 and since the tendency of each wheel to rotate about its axis 47 is always counterbalanced by a tendency for the opposite wheel 27 to rotate in the opposite direction there will result a steadying influence on the steering gear and no possibility of shimmying or wabbling of the wheels.

Another advantage flowing from the construction disclosed herein is that, since the tendency of one of the wheels to rotate about its axis 47 is always counterbalanced by an opposing tendency of the other wheel to rotate about its axis 47, the steering of the wheels is thereby facilitated. Ease of steering is also promoted by having the wheels, at all times, driven at a uniform angular velocity.

While we have illustrated and described what we now consider to be the preferred form of our invention it will be understood that various changes may be made in the details of construction and arrangement of the parts without departing from the spirit of the invention as defined in the appended claims.

Having thus described our invention, we claim:

1. In a motor vehicle, the combination of a frame, a substantially rigid front axle housing in supporting relation thereto, a differential in said housing, substantially rigid axle shafts driven by said differential and rotatably supported in bearings in the outer ends of said housing and projecting outwardly therefrom, said bearings being maintained by said housing in permanent axial alignment with said differential, hollow steering spindles having pivotal connection with the ends of said housing, wheels rotatably mounted on said spindles and so arranged that their centers of ground contact are located outwardly of the points of intersection of the axes of said pivotal connections with the ground, wheel-driving shafts extending through said hollow spindles, each of said wheel-driving shafts being connected with one of said axle shafts by a double universal joint, and one of the shafts connected by each of said double universal joints being axially movable to accommodate the steering movements of said steering spindles.

2. In a motor vehicle, the combination of a frame, a substantially rigid front axle housing in supporting relation thereto, a differential in said housing, substantially rigid axle shafts driven by said differential and rotatably supported in bearings in the outer ends of said housing and projecting outwardly therefrom, said bearings being maintained by said housing in permanent axial alignment with said differential, hollow steering spindles having pivotal connection with the ends of said housing, wheels rotatably mounted on said spindles and so arranged that their centers of ground contact are located outwardly of the points of intersection of the axes of said pivotal connections with the ground, wheel-driving shafts extending through said hollow spindles, each of said wheel-driving shafts being connected with one of said axle shafts by a double universal joint, and said axle shafts being axially movable to accommodate the steering movements of said steering spindles.

DONALD M. FERGUSON.
EDWIN R. MAURER.